United States Patent [19]

Björklund

[11] Patent Number: 5,751,563
[45] Date of Patent: May 12, 1998

[54] HVDC TRANSMISSION

[75] Inventor: Per-Erik Björklund, Ludvika, Sweden

[73] Assignee: Asea Brown Boveri AB, Vasteras, Sweden

[21] Appl. No.: 722,169

[22] PCT Filed: Jun. 26, 1995

[86] PCT No.: PCT/SE95/00782

§ 371 Date: Oct. 10, 1996

§ 102(e) Date: Oct. 10, 1996

[87] PCT Pub. No.: WO96/01517

PCT Pub. Date: Jan. 18, 1996

[30] Foreign Application Priority Data

Jul. 4, 1994 [SE] Sweden .................. 9402359

[51] Int. Cl.[6] ........................................ H02J 3/36
[52] U.S. Cl. .............................. 363/35; 363/37
[58] Field of Search ......................... 363/34, 35, 37, 363/39, 51

[56] References Cited

U.S. PATENT DOCUMENTS

| | | | |
|---|---|---|---|
| 4,625,269 | 11/1986 | Kanngiesser | 363/35 |
| 5,187,651 | 2/1993 | Ekstrom | 363/35 |
| 5,414,612 | 5/1995 | Bjorklund et al. | 363/35 |

FOREIGN PATENT DOCUMENTS 633 864   1/1978   Switzerland .
WO 95/04395   2/1995   WIPO .

OTHER PUBLICATIONS

Derwent's abstract, No 94–149500/18, week 9418, Abstract of SU, 1798824 (Lenin electrotech inst.), 28 Feb. 1993.

Derwent's abstract, No H 8315D/34, week 8134, Abstract of SU, 773866 (Norilsk evening ind), 38 Oct. 1980.

Kimbark, Direct Current Transmission, vol. 1, 1971, Wiley–Interscience, New York, pp. 9–11, Constitution of EHV AC and DC Links.

Gebhardt, HGU–Kurkupplung ohne Transformatoren, 1976, pp. 4–6, Technische Hochschule Darmstadt, 1976/1977.

Uhlmann, Power Transmission by Direct Current, Springer–Verlag Berlin Heildelberg New York, 1975, pp. 14–16.

Primary Examiner—Peter S. Wong
Assistant Examiner—Y. J. Han
Attorney, Agent, or Firm—Pollock, Vande Sande & Priddy

[57] ABSTRACT

An HVDC transmission including at least two converters. Each converter is adapted for connection between a three-phase alternating-voltage network. At least a first converter has ac leads for connection of the first converter to the alternating-voltage network without the use of a separate winding transformer. A dc link is common to the converters. A zero-sequence inductor connection is arranged in the ac leads of the first converter and designed such that the zero-sequence inductor connection exhibits a high impedance to zero-sequence currents and a low impedance to positive-sequence currents.

15 Claims, 7 Drawing Sheets

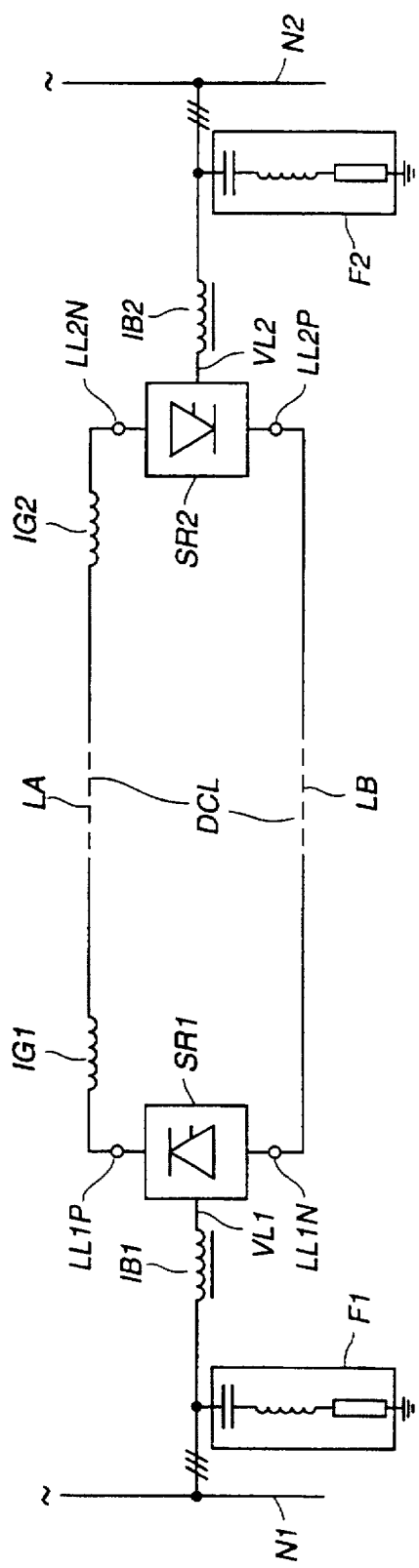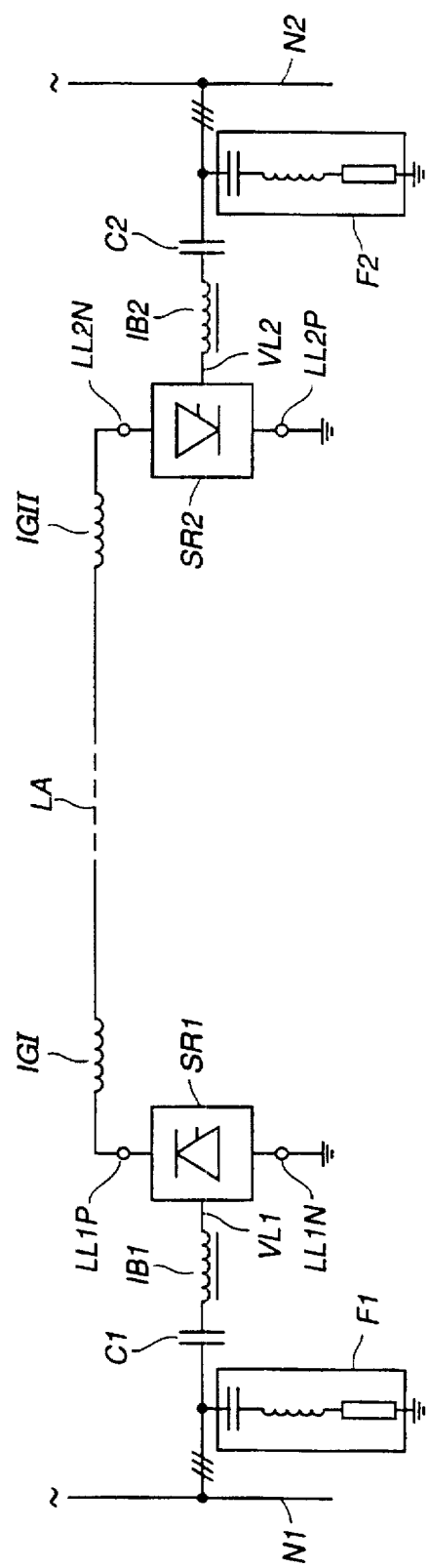

HVDC TRANSMISSION

FIELD OF THE INVENTION

The present invention relates to an HVDC transmission with at least two converters. Each converter is adapted for connection between a three-phase alternating voltage network and a dc link common to the converters. At least a first converter has ac leads for connection of the converter to its alternating-voltage network without the use of a separate winding transformer, or "full transformer".

The concept "HVDC transmission" means in this application an electric installation or equipment for power transmission by means of high-voltage direct current. The concept comprises two main types of installations. The first of these types consists of installations adapted for power transmission between two or more spaced-apart converter stations, which are interconnected by means of dc-carrying cables or overhead lines. The second of the types consists of so-called back-to-back connections, in which two converters arranged in the same converter station are each connected to a separate alternating-voltage network, are dc-connected to each other and adapted for controllable power transmission between the alternating-voltage networks.

In the first type of installation, the dc link consists of the cable or cables or lines which connect the dc sides of the converter stations. In the second type of installation, the dc link generally consists only of a pair of busbars in the station. In both cases, however, certain devices for smoothing and filtering of the direct current, for current and voltage measurement, for protection against overvoltages, among other functions included in the dc link in a known manner.

The expression that a converter is connected to its alternating-voltage network "without the use of a separate winding transformer", or "full transformer" means that the converter is connected to its alternating-voltage network in some way other than with the aid of a separate winding transformer. A converter connected without the use of a separate winding transformer may thus have its alternating-voltage terminals galvanically connected to the alternating-voltage network, directly or via an auto-transformer, and possibly via inductors for current limitation. A converter connected without the use of a separate winding transformer may alternatively have its alternating-voltage terminals connected to the alternating-voltage network via series capacitors.

Analogously, this application uses the concept "transformerless" connection for those cases where no transformer of any kind, thus neither a separate winding transformer nor an auto-transformer, is used for connection of a converter to its alternating-voltage network. In this case, thus, the converter may have its alternating-voltage terminals connected to the alternating-voltage network galvanically, or via series capacitors.

BACKGROUND OF THE INVENTION

In an HVDC transmission, each one of the converters usually consists of two series-connected six-pulse bridges. Each bridge is connected to the alternating-voltage network via a separate winding transformer. The transformers of the bridges, or the valve windings of a common transformer, are designed with different connections, usually star- and delta-connections, in such a way that the alternating voltages of the bridges are phase shifted 30°. Hence, the converter is of twelve-pulse design. HVDC transmissions of this kind are amply described in the literature, for example in Erich Uhlmann: "Power Transmission by Direct Current", Springer-Verlag Berlin Heidelberg New York 1975 (see, e.g. Fig. 2.7, page 15, or Fig. B.1, page 187).

Since the converter bridges are connected to the alternating-voltage network via transformers, a possibility of technical-economic optimization of the direct-voltage level and the dc level of the transmission is provided. By connecting the converter bridges to the alternating-voltage network via separate winding transformers, galvanic separation between the bridges and the alternating-voltage network is obtained. This means that, in the manner described above, two converter bridges may be direct-voltage series-connected. Hence, a higher resultant pulse number and a reduction of the harmonic content, theoretically an elimination of the lowest harmonics, may be obtained. In this way, the amount of filter equipment may be reduced. This is important since the cost of the filter equipment constitutes an essential part of the total cost of a typical HVDC installation. The galvanic separation also means that a converter cannot leak a direct current out into the alternating-voltage network. Current leakage includes a risk of disturbances, such as transformer saturation.

The advantages of the type of converter station described above have resulted in this type being practically universally prevailing in HVDC installation.

In the dissertation "HGÜ-Kurzkupplung ohne Transformatoren", by Dipl.-Ing. Knut Gebhardt, Technische Hochschule Darmstadt, 1976/1977, it has been proposed to connect the converters in a transformerless manner in an HVDC back-to-back connection. This paper shows the above-described conventional connection in Figure 1, page 4, and an example of a transformerless connection in Figure 2, page 5. At first glance, the transformerless connection is economically advantageous since the relatively high cost of the convertor transformers is eliminated. However, the connection has several disadvantages, which have caused this connection not to be used in practice to any significant extent.

First of all, the direct-voltage level of the installation is determined by the voltage in the alternating-voltage networks. This means that there is no possibility of voltage and current optimization of the dc link and the converters. Secondly, a transformerless HVDC installation is limited to six-pulse operation of the converters. This entails the occurrence of harmonics with low ordinal numbers (5 and 7), which necessitate considerably more costly equipment for harmonic filtering. Thirdly, in an installation of this kind, harmonic currents with ordinal numbers which are odd multiples of 3, that is, harmonic currents of the ordinal numbers 3, 9, 15, 21 . . . , are generated on the dc side of a converter. These currents flow out into the alternating-voltage network of the converter. In this network, the currents are of zero-sequence type and give rise to considerable disadvantages in the form of telecommunication disturbance and voltage distortion in the network. In weak alternating-voltage networks, the voltage distortion becomes such a serious disadvantage that the transformerless connection cannot be used without taking special steps.

However, it is, of course, possible to arrange a filter for harmonic currents of the ordinal numbers 3, 9, 15, 21 . . . , mentioned in the preceding paragraph. Such a filter may thus be arranged on the ac side of a converter. However, the filter will be large and expensive, and it has proved to be difficult to avoid resonance effects between the filter and the alternating-voltage network. Alternatively, a filter for the harmonics just mentioned may be arranged in the form of a blocking filter on the dc side of the converter. Also in this

3 case, however, the dimensions and the costs of the filter equipment will be high, and a considerable risk of resonance effects arises. These facts have caused the transformerless connection to be considered possible only in connection with strong alternating-voltage network.

SUMMARY OF THE INVENTION

The present invention aims to provide an HVDC transmission of the kind described in the introductory part of the description, which is simpler and less expensive than hitherto used transmissions. At the same time, by reducing or completely avoiding the above-described network disturbances on the alternating-voltage side in the form of telecommunication interference and voltage distortion, the present invention may be used also in weak alternating-voltage networks.

BRIEF DESCRIPTION OF THE DRAWINGS

The invention will be described in greater detail in the following with reference to the accompanying FIGS. 1–7.

FIG. 5 schematically shows an HVDC transmission consisting of two geographically separated converter stations according to the invention, which are interconnected by a dc line;

FIG. 6 shows an HVDC transmission according to the invention, in which the two converters are connected to their alternating-voltage networks via series capacitors.

DESCRIPTION OF THE PREFERRED EMBODIMENTS

Figure 1:
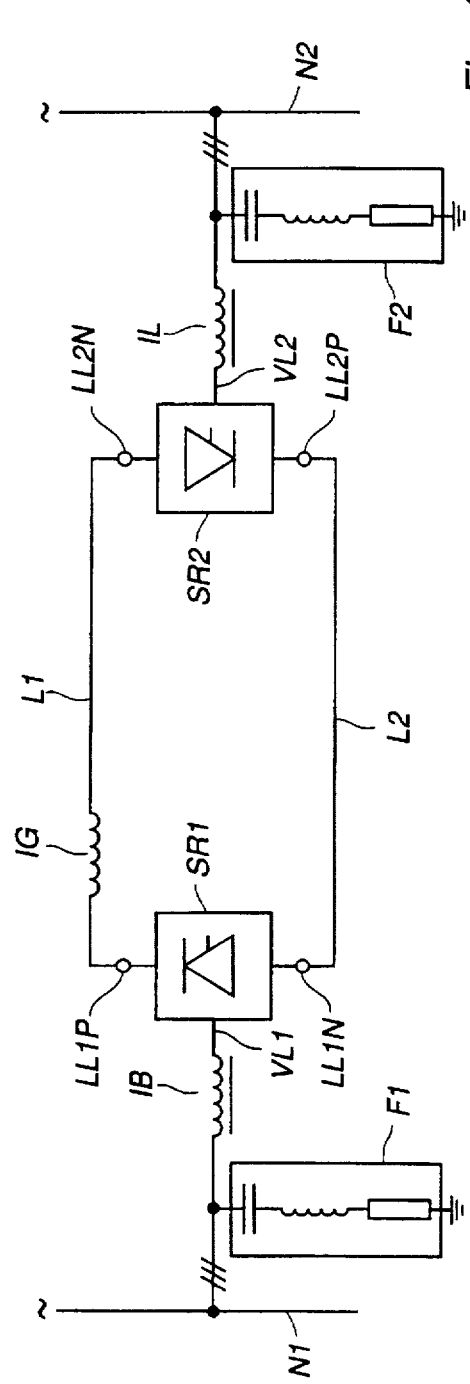
FIG. 1 shows an HVDC transmission according to the invention designed as a back-to-back connection.

FIG. 1 shows, in the form of a single-line diagram, an embodiment of a back-to-back connection according to the invention. It is intended for controllable power transmission between two three-phase electric ac power networks N1 and N2. It consists of two controllable high-voltage converters SR1 and SR2, arranged in a single converter station. The ac leads VL1 of the converter SR1 are connected to the alternating-voltage network N1 via a three-phase zero-sequence inductor connection IB, schematically shown in the figure. The inductor connection IB is designed such that it has a high impedance to zero-sequence currents and a low impedance to positive-sequence currents. The inductor connection IB will be described in more detail below.

The ac leads VL2 of the converter SR2 are connected to the alternating-voltage network N2 via current-limiting inductors IL. Further, on its ac side, each converter has a schematically shown harmonic filter, F1 and F2, respectively. The dc terminals LL1P, LL1N and LL2P, LL2N, respectively, of the converters are interconnected via conductors L1 and L2. Conductors L1 and L2 consist of busbars

4 or the like in the converter station. In one of these conductors, a smoothing inductor IG for the direct current is arranged in conventional manner.

The inductor connection IB will effectively prevent zero-sequence currents of other than negligible magnitude from occurring on the ac side of the converter SR1. This greatly reduces the disturbances, described above, which are caused by the presence of these currents in alternating-voltage networks. This makes possible the use of a transformerless HVDC transmission for connection not only to very strong alternating-voltage networks, but also to weaker networks.

The converters with their ac leads form together with the dc link L1-L2 a continuous and branch-free current path for zero-sequence currents. The inductor connection IB prevents zero-sequence currents from arising at one location in this current path, namely, on the ac side of the converter SR1. No zero-sequence currents will therefore arise at other locations in this current path, that is, not on the ac side of the converter SR2 either. Therefore, no special zero-sequence inductor connection is arranged in the leads of the converter SR2.

Figure 2:
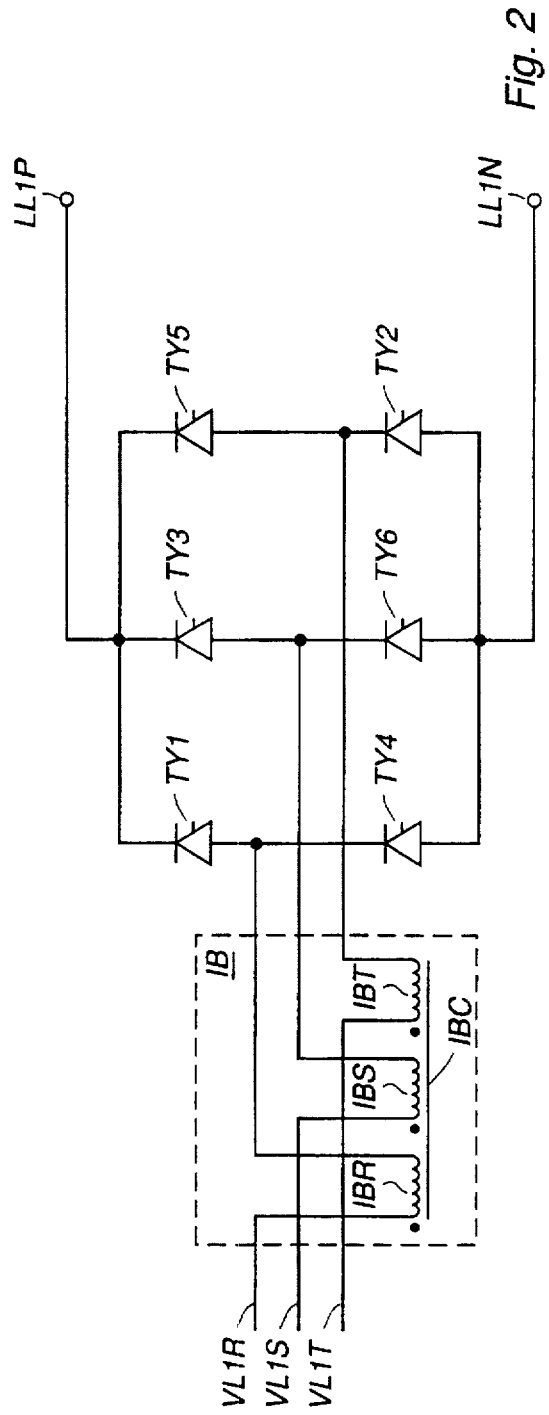
FIG. 2 shows in more detail the main circuits of one of the converters in the back-to-back connection according to FIG. 1.

FIG. 2 shows the main circuits of the converter SR1 in the back-to-back connection according to FIG. 1. The converter is a converter of the same kind as is currently used for HVDC transmissions. It is a six-pulse line-commutated phase-angle controlled thyristor converter with the valves TY1–TY6. Each valve consists of a plurality of series-connected thyristors with parallel-connected damping circuits and overvoltage protective means. The converter has the dc connections LL1P and LL1N and the ac leads VL1R, VL1S and VL1T. Because of the presence smoothing inductor IG, shown in FIG. 1, arranged on the dc side of the converter, the function of the converter is that of a current-source converter.

As shown in FIG. 2, the zero-sequence inductor connection IB may consist of a three-phase inductor with an iron core IBC and three phase windings IBR, IBS and IBT with the polarities shown in the figure and each one connected into one of the three leads of the converter. For zero-sequence currents, the inductor has a very high impedance, whereas its impedance to positive-sequence currents is very low.

The converter SR2 is designed in the same way. As mentioned, however, it does not have the zero-sequence inductor connection but has instead the current-limiting inductors IL, which replace the impedance of the converter transformer existing in conventional HVDC transmissions. The inductors may be air inductors. Each of the ac leads of the converter SR2 may include an inductor. Also, each inductor may have an inductance adapted such that the inductors limit the valve currents in the converter SR2 to harmless values for the types of faults occurring, for example short circuits or ground faults. The inductor connection IB is designed with a leakage impedance of such a magnitude that it fulfils the corresponding function for the converter SR1.

Figure 3:
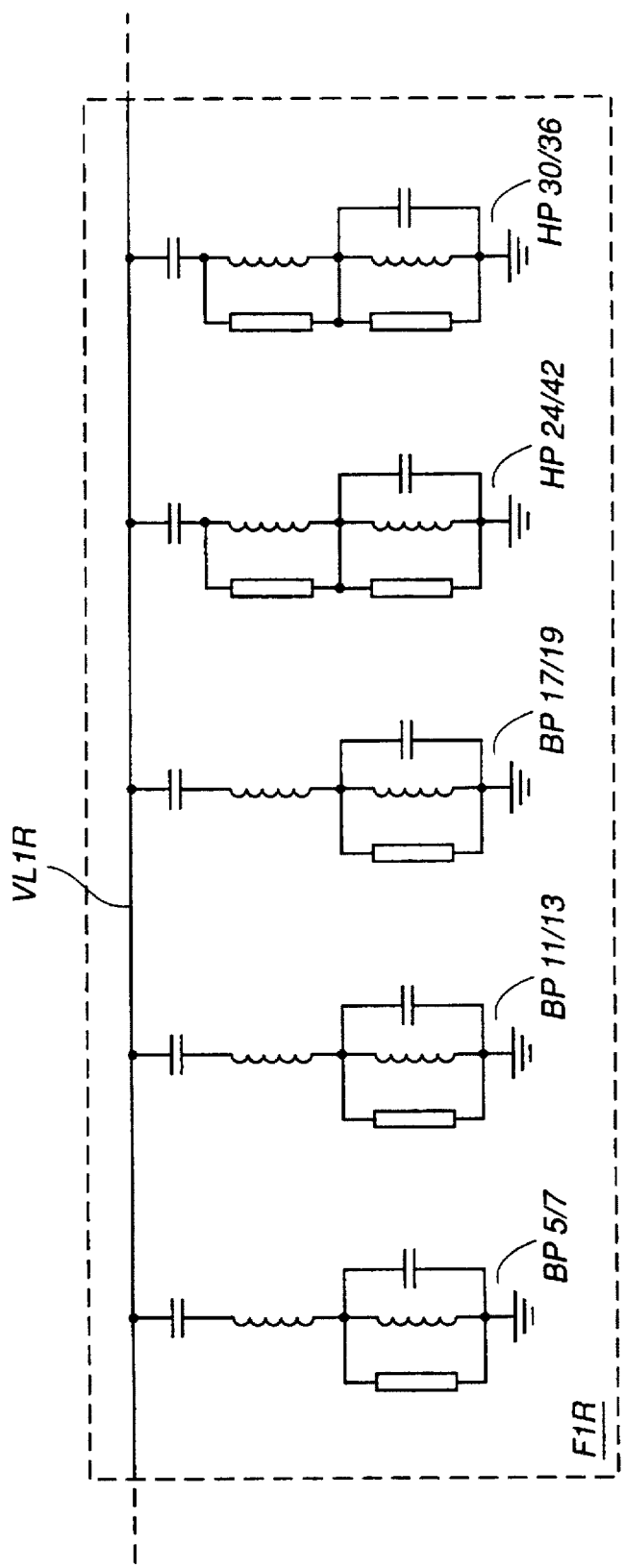
FIG. 3 shows an example of the embodiment of a phase of the harmonic filter in the back-to-back connection according to FIG. 1.

FIG. 3 shows an example of the embodiment of a phase F1R in the filter circuit F1 in the back-to-back connection according to FIG. 1. It is connected to the ac conductor VL1R between the network N1 and the converter SR1, preferably between the network and the inductor connection IB. The filter circuit consists of double-tuned bandpass filters for tones 5 and 7 (BP5/7), 11 and 13 (BP11/13) and 17 and 19 (BP17/19). The filter also includes double-tuned high-pass filters for tones 24 and 42 (HP24/42) and for tones 30 and 36 (HP30/36). The high-pass filters are suitably designed also provide sufficient damping for tones of ordinal numbers 47 and 49.

In the HVDC installation shown in FIG. 1, only one of the converters—SR1—has a zero-sequence inductor connection in its ac leads. The other converter—SR2—has current-limiting inductors in its ac leads. Alternatively, of course, zero-sequence inductor connections may be arranged in the ac leads of both converters. Likewise, depending on the impedances of networks and other components of the installations, current-limiting inductors may be arranged in the ac leads of both converters or, possibly, be completely omitted.

To achieve the desired function—a high impedance to zero-sequence currents and a low impedance to positive-sequence currents—it is important that the zero-sequence connection IB is designed such that a good magnetic coupling is obtained between the windings of the inductor. Further, it is important that a high degree of symmetry be obtained in the inductor connection. FIGS. 4a–4d show examples of an embodiment of a zero-sequence inductor connection according to the invention.

Figure 4A:
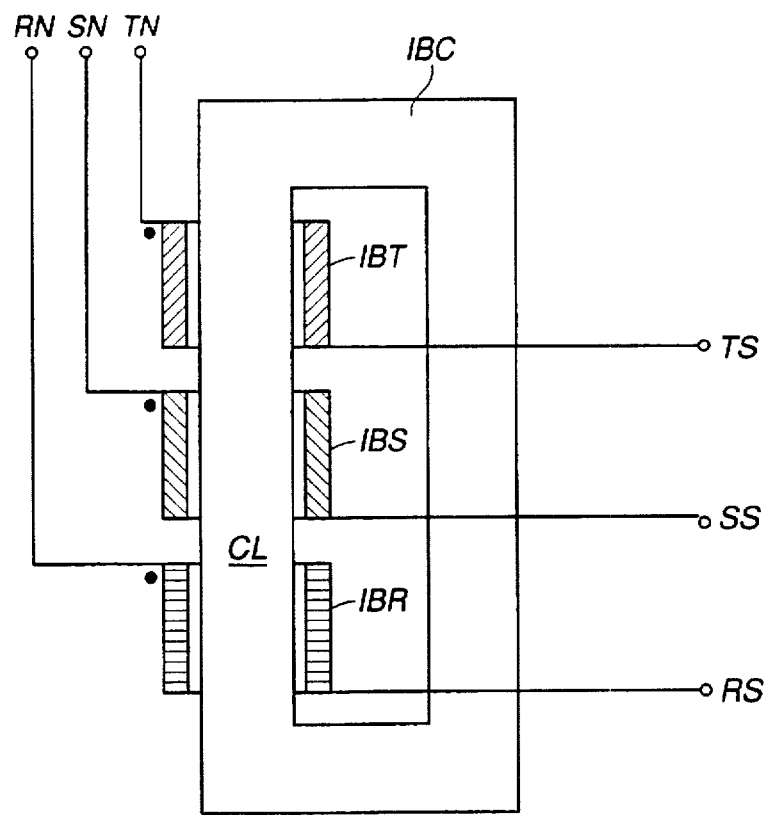
FIGS. 4a, 4b, 4c and 4d show examples of the embodiment of the zero-sequence inductor in the back-to-back connection in FIG. 1.

FIG. 4a shows the principle of a zero-sequence inductor connection according to the invention. The windings IBR, IBS, IBT are arranged on a common core IBC. The windings have the connections RN, SN, TN for connection of that side of the windings facing the network and connections RS, SS, TS for connection of that side of the windings facing the converter. Provided that the coupling and the symmetry are complete, positive-sequence currents provide ampere-turn balance in the core. That is, no flux arises in the core. Also, the induced EMF and, hence, the impedance to positive-sequence currents become zero. Under the same conditions, zero-sequence co-phasal currents in the three windings, will cooperate and provide a flux in the core, that is, an induced EMF and an impedance which is high, as long as the core does not become saturated.

Figure 4B:
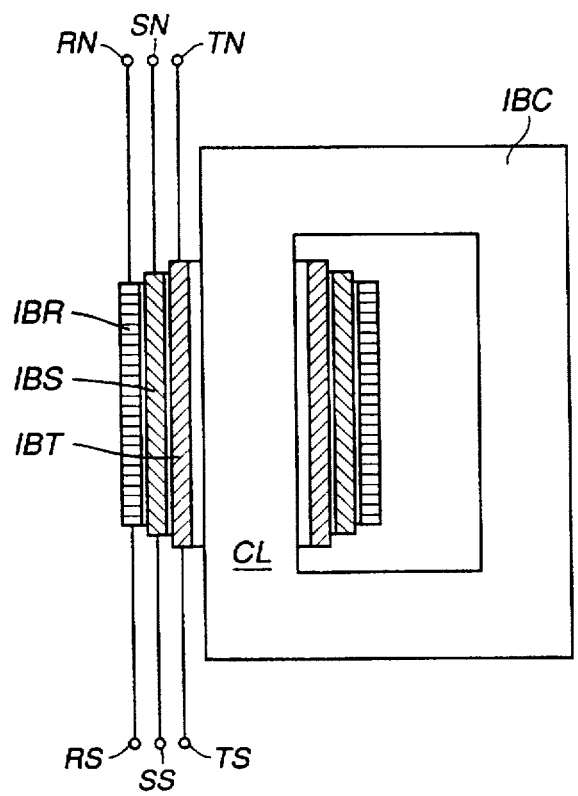

To obtain as good a coupling between the windings as possible, it is advantageous to arrange the windings one outside the other and to design them as long as is allowed by the dimensions of the core. FIG. 4b shows such an embodiment of the zero-sequence inductor. In this case, the inductor is, in principle, designed as a single-phase three-winding transformer.

Figure 4C:
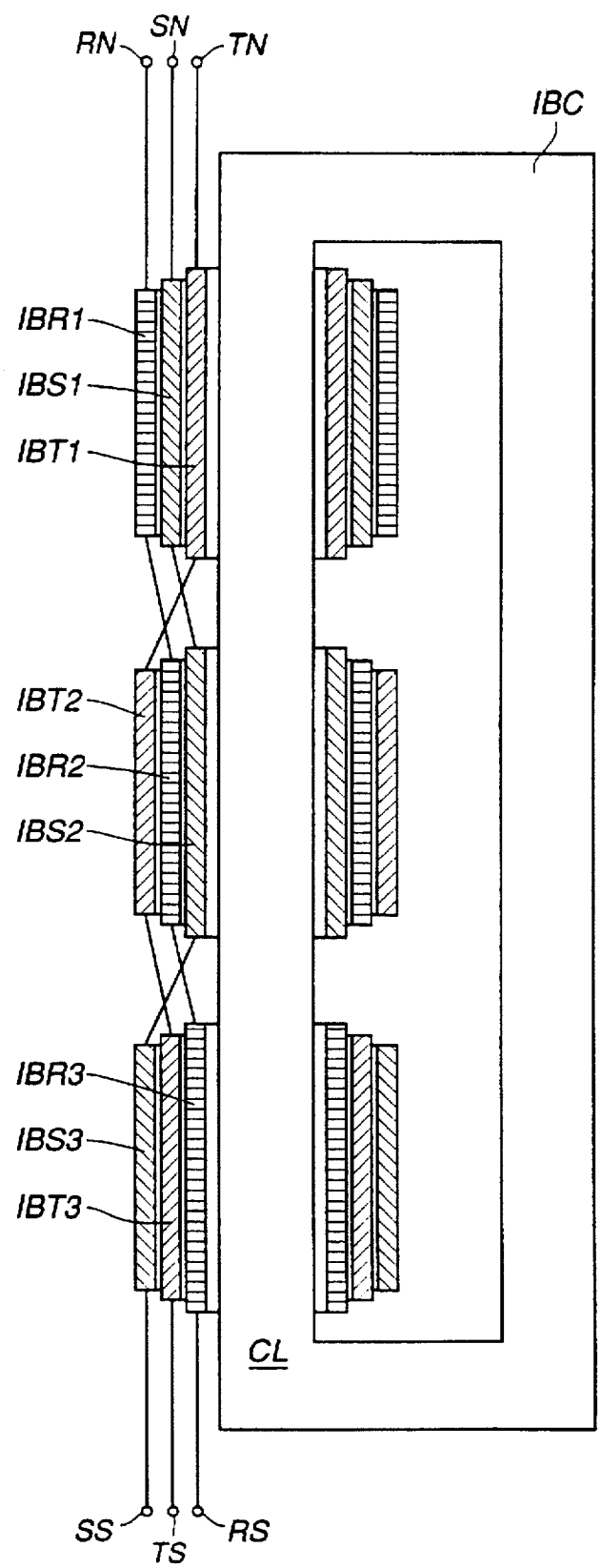

To obtain full symmetry, as shown in FIG. 4c, each one of the three windings of the inductor connection may be divided into three series-connected sections. These sections are arranged in three groups such that each group contains three sections belonging to different windings and arranged one above the other. Also, the sections are arranged such that each winding has one section outermost in one group, in the center position in another group, and innermost in the third group. The winding IBR thus has the three sections IBR1, IBR2 and IBR3. Section IBR1 lies outermost in the uppermost group in the figure. Additionally, section IBR2 lies in the center position in the middle group. Furthermore, section IBR3 lies innermost in the lowermost group.

An alternative to the embodiment shown in FIG. 4c is to design the zero-sequence inductor connection as three series-connected units of the kind shown in FIG. 4b, wherein the radial location of the windings is permuted between the three units in the same way as for the three groups in FIG. 4c.

Figure 4D:
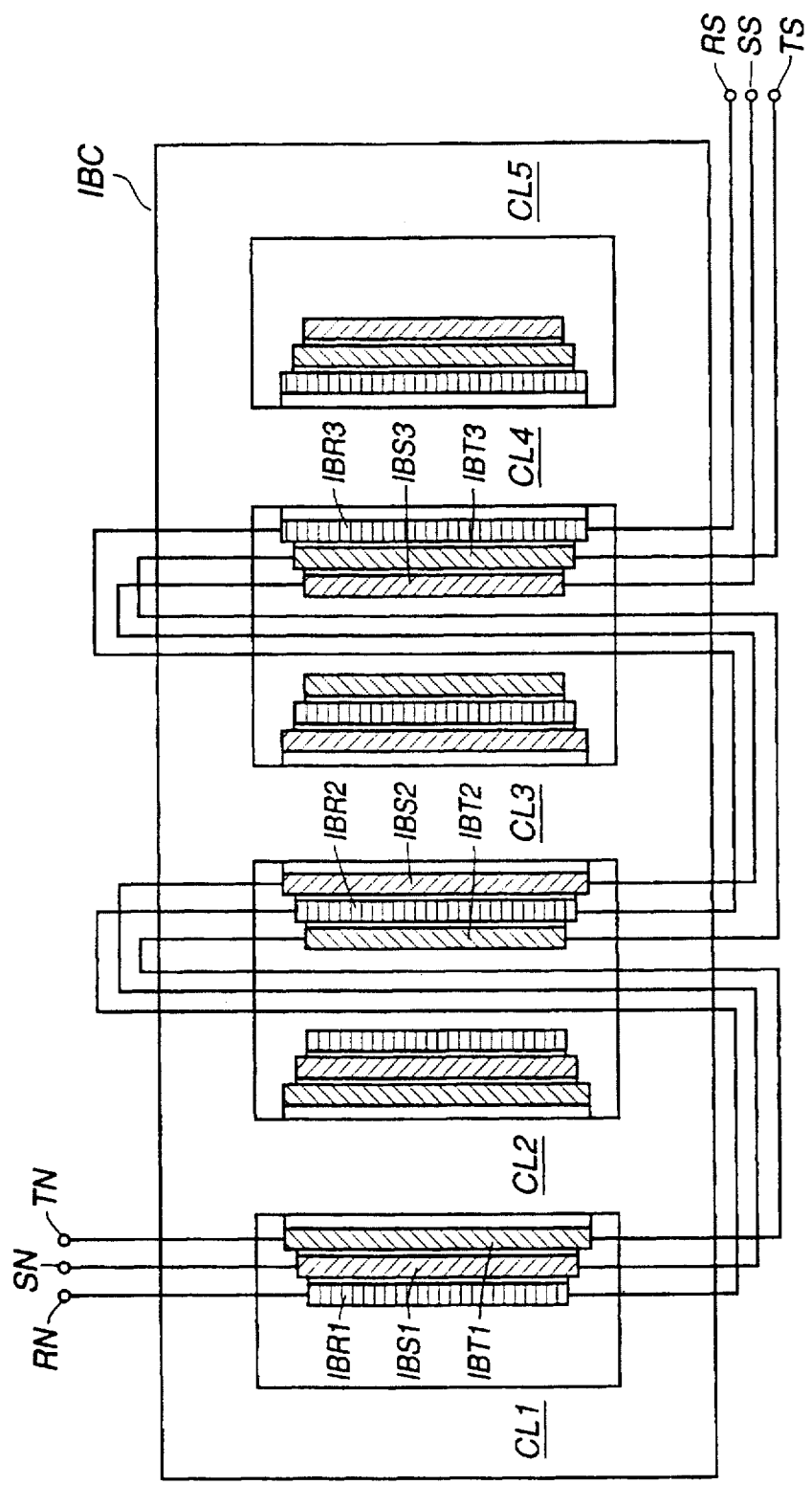

To obtain full symmetry, and to obtain ampere-turn balance in all parts of the core for positive-sequence currents, that is, to obtain the lowest possible positive-sequence impedance, the inductor connection according to FIG. 4 is, in practice, designed in the manner shown in FIG. 4d. That is, the inductor connection is designed with each phase winding divided into three series-connected sections. One of these sections is arranged on each one of the three legs supporting windings. Also, the inductor connection is designed with the radial positions of the sections permuted between the three legs in the same way, in principle, as in the inductor connection shown in FIG. 4c.

FIG. 5 schematically shows an embodiment of an HVDC transmission according to the invention consisting of two geographically separated converter stations with converters SR1 and SR2, which are interconnected by means of a line DCL with the conductors LA and LB. The line may consist of an overhead line or a cable disposed in the ground or the water, or of a combination thereof. Each station is designed in the manner shown in FIG. 1 and its components have the same designations as in FIG. 1.

In this case, however, contrary to the case with the installation shown in FIG. 1, each station includes a separate positive-sequence inductor connection, IB1 and IB2, respectively, of the kind described above. This ensures efficient blocking of the zero-sequence currents generated by each converter. If only one of the converters included a zero-sequence inductor, because of the normally significant line capacitance, an efficient blocking of the zero-sequence currents of the other converter would not be obtained.

Further, in the transmission according to FIG. 5, each station has a smoothing inductor, IG1 and IG2, respectively.

FIG. 6 shows an embodiment of an HVDC transmission according to the invention, which substantially corresponds to the embodiment shown in FIG. 5. In the embodiment shown in FIG. 6, the converters are connected to their alternating-voltage networks via series capacitors C1 and C2, respectively. The series capacitors function as direct-voltage barriers and, hence, they make possible grounding of the direct-voltage side of each converter at one point. FIG. 6 shows how one pole of each converter is grounded, whereby the line between the converter stations may consist of one single conductor LA. The return of the direct current takes place through ground. FIG. 6 thus shows a monopolar HVDC transmission.

Figure 7A:
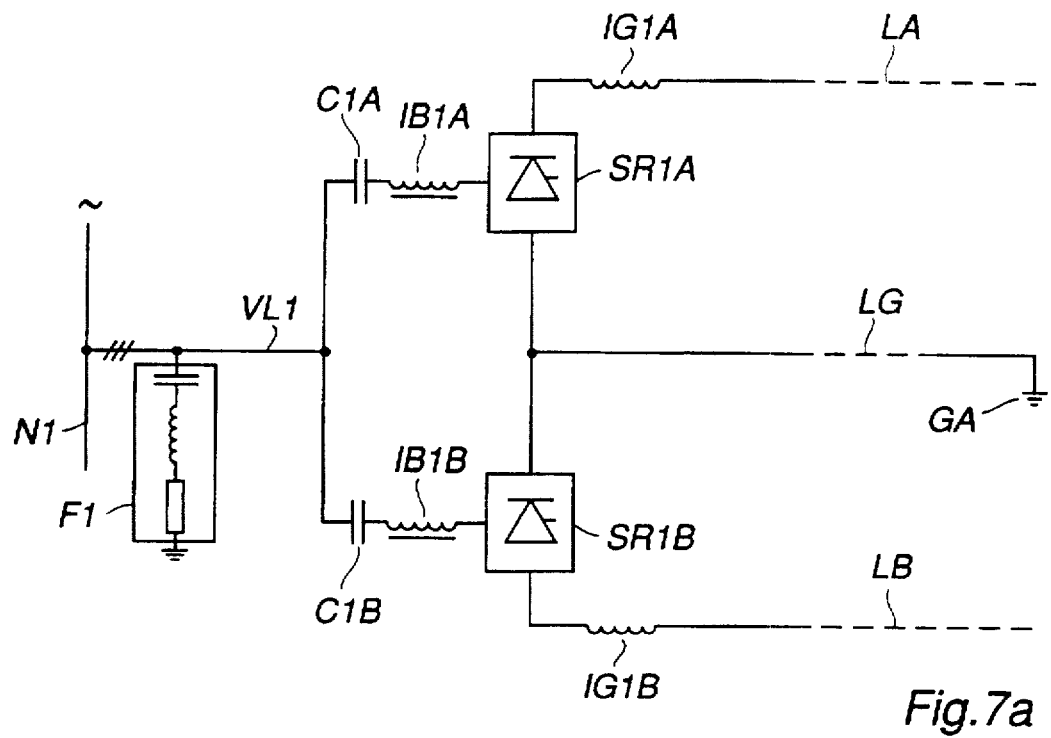
FIG. 7a and FIG. 7b show two variants of a bipolar converter station in an HVDC transmission according to the invention.

However, the use of series capacitors in the embodiment shown in FIG. 6 also makes it possible to apply the invention to a bipolar HVDC transmission. One of the two converter stations in such a transmission is shown in FIG. 7a. It has two converters, SR1A and SR1B. Each of them is connected to the network N1 via a series capacitor, C1A and C1B, respectively, and a zero-sequence inductor, IB1A and IB1B, respectively. Filter equipment F1 for harmonic filtering, common to the converters, is connected to the alternating-voltage side of the converters. Each converter is provided with a smoothing inductor, IG1A and IG1B, respectively. The station has a ground terminal GA, which is connected to the station through a ground line LG. The converter SR1A has one of its direct-voltage connections connected to one of the conductors LA of the transmission line via the inductor IG1A. The other direct-voltage connection is connected to the ground line LG. The converter SR1B has one of its direct-voltage connections connected to the other conductor—LB—of the transmission line via the inductor IG1B and the other direct-voltage connection connected to the ground line LG.

Figure 7B:
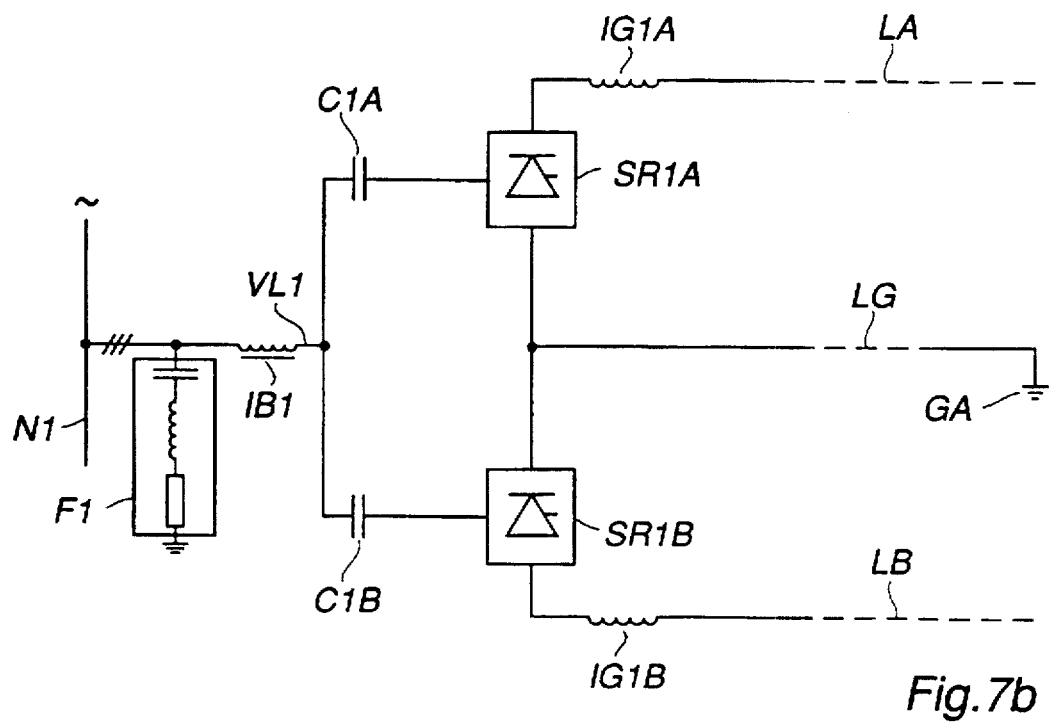

Alternatively, as shown in FIG. 7b, a zero-sequence inductor IB1 which is common to the two converters SR1A and SR1B may be arranged in the lead VL1, between the network N1 and the converters, which is common to the converters.

In the foregoing, only such embodiments of the invention have been described where all the converters included in the HVDC transmission are connected to their respective alternating-voltage networks in a transformerless manner—either directly galvanically or via series capacitors. However, other embodiments are also feasible within the scope of the invention.

Thus, for example, a converter may be connected to its alternating-voltage network via an auto-transformer. Such an embodiment offers the advantages that the current and voltage levels of the dc link and the converter may be chosen independently of the voltage of the alternating-voltage network. Therefore, the transmission may be used for power transmission between alternating-voltage networks with different voltages. Also, the current-limiting inductors described above, for example, IL shown in FIG. 1, may be superfluous. Furthermore, an on-load tap changer of the transformer may be used to take up changes in the ratio between the direct voltage of the converter and the voltage of the alternating-voltage network. This provides the possibility of operating with more optimal control angles of the converter from the reactive-power point of view. Since auto-transformers are considerably less expensive than separate winding transformers, utilizing such transformers results in an important saving of costs as compared with conventional HVDC transmissions with separate winding transformers.

The converters at both ends of a dc link may be connected to their alternating-voltage networks via auto-transformers. Alternatively only the converter at one end of the link may be connected to an alternating-voltage network via an auto-transformer. In the latter case, the converter at the other end of the link is either transformerless or connected to its alternating-voltage network via a separate winding transformer.

As mentioned above, one of the converters of a transmission may be connected to its alternating-voltage network via a separate winding transformer. The converter at the other end of the link may then either be transformerless or connected via an auto-transformer. In this case, the tap-changer of the separate winding transformer may be utilized to take up variations in the voltage of the alternating-voltage network. Also, the reactive-power consumption may thereby be kept low. Additionally, the dc link and the converters may be optimized independently of the voltage of the alternating-voltage network in the stations provided with transformers. Furthermore, where the converter is connected via a separate winding transformer, no mutual inductor is needed for blocking the effect of the link on the alternating-voltage network.

In those embodiments of an HVDC transmission according to the present invention in which a converter is not connected to its alternating-voltage network via a transformer provided with a tap-changer, variations in the ratio between the voltage of the alternating-voltage network and the voltage of the dc link must be taken up by changes of the control angle of the converter. This entails an undesirable increase of the reactive-power consumption of the converter and/or of the variations in this consumption. If considered necessary, these disadvantages may be counteracted or eliminated by providing the alternating-voltage side of the converter with known controllable reactive-power means, such as capacitors, inductors, or, for example, a combination of switchable capacitors and phase-angle controlled inductors.

In those cases where an HVDC transmission according to the invention has a transformerless connection of the converter at one end of the dc link and a converter connection via a transformer provided with a tap-changer at the other end of the link. it is suitable to allow the former converter to operate with a fixed control angle selected to minimize the reactive-power consumption, whereby variations in the ratio between the voltages of the alternating-voltage networks are taken up by the tap-changer.

It has been found that the negative influence of HVDC transmission on the alternating-voltage network may be maintained especially low if a connection without a separate winding transformer according to the invention is provided with a control system that controls each of the two halves of a six-pulse converter individually in such a way that direct currents in the two dc leads of the converter are always maintained as equal as possible.

An HVDC transmission between two or more geographically separated converter stations, which are interconnected by means of overhead lines or cables, may contain two or more converters connected without the use of separate winding transformers. In this case, as shown in FIG. 5, each converter or converter station connected without the use of a separate winding transformer may have a zero-sequence inductor connection on its ac side. Alternatively, only one of, or certain ones of, the converter stations may be provided with such inductor connections. The other converter/stations connected without a separate winding transformer may then be provided with some other type of means for blocking zero-sequence currents, for example with a zero-sequence inductor connection on the dc side.

I claim:

1. An HVDC transmission, comprising:
   at least two converters, wherein each converter is adapted for connection between a three-phase alternating-voltage network wherein at least a first converter has ac leads for connection of the first converter to the alternating-voltage network without the use of a separate winding transformer;
   a dc link common to the converters
   a zero-sequence inductor connection arranged in the ac leads of the first converter and designed such that the zero-sequence inductor connection exhibits a high impedance to zero-sequence currents and a low impedance to positive-sequence currents.

2. An HVDC transmission according to claim 1, wherein at least the first converter is a current-source line-commutated converter.

3. An HVDC transmission according to claim 1, wherein said HVDC transmission is a back-to-back connection including two converters which are dc-connected to each other, and wherein each of the two converters is connected to a separate alternating-voltage network without utilizing a separate winding transformer, and wherein only one of the converters is provided with a zero-sequence inductor connection arranged in the ac leads.

4. An HVDC transmission according to claim 1, further comprising a dc line connecting said at least two converters, wherein said at least two converters are geographically separated from each other.

5. An HVDC according to claim 1, further comprising series capacitors arranged in the ac leads of the converter, wherein at least one of the converters is connected to the alternating-voltage network without the use of the separate winding transformer and via said series capacitors.

6. An HVDC transmission according to claim 5, further comprising a converter station including two converters connected to an alternating-voltage network, each of said converters being dc-connected between one of two pole conductors said HVDC tramnission and a common ground line, wherein said HVDC transmission is designed as a bipolar transmission and wherein each of the two converters is connected to the alternating-voltage network via the series capacitors arranged in the ac leads of the converter.

7. An HVDC transmission according to claim 6, wherein each of the two converters of the station includes the separate zero-sequence inductor connection.

8. An HVDC transmission according to claim 6, wherein the zero-sequence inductor connection common to the two converters of the station is arranged between the converters and the alternating-voltage network.

9. An HVDC transmission according to claim 1, further comprising current-limiting reactors are arranged in the ac leads to at least one of the converters.

10. An HVDC transmission according to claim 1, wherein each converter includes an alternating-voltage side, each alternating-voltage side being provided with harmonic filter circuits adapted for filtering of tones of the ordinal numbers $6m\pm1$, where m is a positive integer, and wherein the filter circuits for the converters which are connected without any separate winding transformer comprise filters for tones of the ordinal numbers 5 and 7.

11. An HVDC transmission according to claim 1, wherein the zero-sequence inductor connection includes an iron core and three windings arranged on the core, wherein each one of the windings is arranged in one of the three ac leads to one of the converters.

12. An HVDC transmission according to claim 11, wherein the windings are arranged radially one outside the other.

13. An HVDC transmission according to claim 11, wherein each winding includes three winding sections electrically series connected to each other, wherein the sections are arranged in three winding groups with each group comprising one section from each one of the three windings, wherein the three sections in each group are arranged radially one outside the other, and wherein the radial positions of the sections are permutated between the groups.

14. An HVDC transmission according to claim 13, wherein the winding groups are arranged one after the other along one core leg.

15. An HVDC transmission according to claim 13, wherein the iron core includes five core legs, and wherein the windings are arranged on three of the core legs with one of the three winding groups on each one of the three legs provided with a winding.

* * * * *